US012767583B2

(12) United States Patent
Li et al.

(10) Patent No.: US 12,767,583 B2
(45) Date of Patent: Oct. 20, 2026

(54) LITHIUM-ALUMINOSILICATE GLASS, LITHIUM-ALUMINOSILICATE CHEMICALLY STRENGTHENED GLASS, PREPARATION METHOD THEREFOR, AND APPLICATION THEREOF

(71) Applicant: HUNAN KIBING ELECTRONIC GLASS CO., LTD., Hunan (CN)

(72) Inventors: Shuchen Li, Hunan (CN); Congbin Gu, Hunan (CN); Tianbo Zhao, Hunan (CN); Hanfei Dong, Hunan (CN); Chongli Zou, Hunan (CN)

(73) Assignee: HUNAN KIBING ELECTRONIC GLASS CO., LTD., Hunan (CN)

( * ) Notice: Subject to any disclaimer, the term of this patent is extended or adjusted under 35 U.S.C. 154(b) by 507 days.

(21) Appl. No.: 18/264,846

(22) PCT Filed: Feb. 8, 2022

(86) PCT No.: PCT/CN2022/075479

§ 371 (c)(1),
(2) Date: Aug. 9, 2023

(87) PCT Pub. No.: WO2022/171069

PCT Pub. Date: Aug. 18, 2022

(65) Prior Publication Data

US 2024/0116799 A1 Apr. 11, 2024

(30) Foreign Application Priority Data

Feb. 9, 2021 (CN) ......................... 202110177598.1

(51) Int. Cl.
*C03C 3/085* (2006.01)
*C03C 21/00* (2006.01)

(52) U.S. Cl.
CPC ............ *C03C 3/085* (2013.01); *C03C 21/002* (2013.01); *C03C 2201/40* (2013.01); *C03C 2201/50* (2013.01)

(58) Field of Classification Search
CPC ... C03C 3/085; C03C 21/002; C03C 2201/40; C03C 2201/50
See application file for complete search history.

(56) References Cited

U.S. PATENT DOCUMENTS 6,440,531 B1 8/2002 Kurachi et al.
6,547,980 B1 4/2003 Kurachi et al.
(Continued)

FOREIGN PATENT DOCUMENTS

CN 102015566 A 4/2011
CN 102363567 A 2/2012
(Continued)

OTHER PUBLICATIONS

Extended European Search Report for EP Application No. 22752230.7; Issue Date, Jan. 30, 2025, 8 pages.
(Continued)

*Primary Examiner* — Crystal J Lee
(74) *Attorney, Agent, or Firm* — CANTOR COLBURN LLP

(57) ABSTRACT

A lithium-aluminosilicate glass is provided in the present application. The lithium-aluminosilicate glass includes, by mole percent of oxides, the following components: $SiO_2$, 62-68 mol %; $Al_2O_3$, 9-14 mol %; $Na_2O$, 6-10 mol %; $K_2O$, 0.2-0.7 mol %; and $Li_2O$, 8.0-14.0 mol %; where $(Li_2O+Na_2O+MgO)/Al_2O_3$ is 1.7-2.5. By means of controlling the mole percents of $SiO_2$, $Al_2O_3$, $Na_2O$, $K_2O$, and $Li_2O$, as well as the range of the ratio $(Li_2O+Na_2O+MgO)/Al_2O_3$, it is consequently ensured that the obtained lithium-aluminosilicate glass, upon chemical strengthening, has high strength,
(Continued)

satisfies a requirement of a client with respect to "film-peeling electrostatic voltage", and further has uniquely advantageous effects of a lower melting temperature and being able to save energy and reduce energy consumption.

19 Claims, 1 Drawing Sheet

(56) References Cited

U.S. PATENT DOCUMENTS

| | | | |
|---|---|---|---|
| 9,096,460 | B2 | 8/2015 | Brix et al. |
| 9,388,064 | B2 | 7/2016 | Murata |
| 11,136,258 | B2 | 10/2021 | Dejneka et al. |
| 11,820,706 | B2 | 11/2023 | Dejneka et al. |
| 12,024,464 | B2 | 7/2024 | Murayama et al. |
| 2003/0064196 | A1 | 4/2003 | Kurachi et al. |
| 2006/0063009 | A1 | 3/2006 | Naitou et al. |
| 2010/0011814 | A1 | 1/2010 | Zou et al. |
| 2011/0312483 | A1 | 12/2011 | Nakashima et al. |
| 2012/0264585 | A1 | 10/2012 | Ohara et al. |
| 2013/0034670 | A1 | 2/2013 | Hashimoto et al. |
| 2013/0186140 | A1 | 7/2013 | Brix et al. |
| 2014/0364298 | A1 | 12/2014 | Ohara et al. |
| 2017/0197869 | A1 | 7/2017 | Beall et al. |
| 2018/0244560 | A1 | 8/2018 | Gross et al. |
| 2019/0127265 | A1 | 5/2019 | Dejneka et al. |
| 2020/0109080 | A1 | 4/2020 | Dietrich et al. |
| 2020/0339471 | A1 | 10/2020 | Hu et al. |
| 2021/0009462 | A1 | 1/2021 | Murayama et al. |
| 2022/0009830 | A1 | 1/2022 | Kashima et al. |
| 2022/0017405 | A1 | 1/2022 | Dejneka et al. |
| 2022/0371942 | A1 | 11/2022 | Ping et al. |
| 2023/0056119 | A1 | 2/2023 | Guo et al. |
| 2024/0043316 | A1 | 2/2024 | Dejneka et al. |

FOREIGN PATENT DOCUMENTS

| | | | | |
|---|---|---|---|---|
| CN | 102811963 | A | 12/2012 | |
| CN | 102815860 | A | 12/2012 | |
| CN | 102892723 | A | 1/2013 | |
| CN | 109715573 | A | 5/2019 | |
| CN | 110240419 | A | 9/2019 | |
| CN | 110272205 | A | 9/2019 | |
| CN | 110482855 | A | 11/2019 | |
| CN | 110615610 | A | 12/2019 | |
| CN | 110615611 | A | * 12/2019 | ........... C03C 21/002 |
| CN | 110642514 | A | 1/2020 | |
| CN | 111003936 | A | 4/2020 | |
| CN | 111315697 | A | 6/2020 | |
| CN | 111484245 | A | 8/2020 | |
| CN | 111646693 | A | 9/2020 | |
| CN | 111936438 | A | 11/2020 | |
| CN | 111954647 | A | 11/2020 | |
| CN | 111995243 | A | 11/2020 | |
| CN | 112142323 | A | 12/2020 | |
| CN | 112661405 | A | 4/2021 | |
| CN | 112960904 | A | 6/2021 | |
| JP | 2001026460 | A | 1/2001 | |
| JP | 2006052125 | A | 2/2006 | |
| JP | 2006083045 | A | 3/2006 | |
| JP | 2012232882 | A | 11/2012 | |
| JP | 2019509238 | A | 4/2019 | |
| JP | 2019123658 | A | 7/2019 | |
| WO | 2011096310 | A1 | 8/2011 | |
| WO | 2020121888 | A1 | 6/2020 | |
| WO | 2020261710 | A1 | 12/2020 | |

OTHER PUBLICATIONS

Japanese Office Action corresponding to JP Application No. 2023-548778; Mailing Date, Jun. 6, 2024.

First Chinese Office Action dated Aug. 25, 2021; Chinese Application No. 202110177598.1; 8 pages (non-English).

First Chinese Office Action dated Aug. 25, 2021; Chinese Application No. 202110177598.1; 9 pages (English translation).

International Search Report dated Apr. 15, 2022; International Application No. PCT/CN2022/075479; 2 pages (English).

International Search Report dated Apr. 15, 2022; International Application No. PCT/CN2022/075479; 3 pages (non- English).

Search dated Aug. 19, 2021; Chinese Application No. 202110177598.1; 2 pages.

Second Chinese Office Action dated Oct. 27, 2021; Chinese Application No. 202110177598.1; 7 pages (non- English).

Second Chinese Office Action dated Oct. 27, 2021; Chinese Application No. 202110177598.1; 9 pages (English translation).

Supplemental Search dated Jan. 10, 2022; Chinese Application No. 202110177598.1; 1 page.

Written Opinion dated Apr. 15, 2022; International Application No. PCT/CN2022/075479; 5 pages (non-English).

* cited by examiner

LITHIUM-ALUMINOSILICATE GLASS, LITHIUM-ALUMINOSILICATE CHEMICALLY STRENGTHENED GLASS, PREPARATION METHOD THEREFOR, AND APPLICATION THEREOF

CROSS REFERENCE TO RELATED APPLICATIONS

The present application is a U.S. national phase of International Patent Application No. PCT/CN2022/075479 with an international filing date of Feb. 8, 2022, designating the U.S., now pending, and further claims priority to Chinese patent application No. 202110177598.1, filed with the Chinese Patent Office on Feb. 9, 2021, titled "Lithium-aluminosilicate glass, lithium-aluminosilicate chemically strengthened glass, preparation method therefor, and application thereof", the entire contents of which are incorporated herein by reference.

TECHNICAL FIELD

The present application relates to the technical field of glass technology, and in particular, to a lithium-aluminosilicate glass, a lithium-aluminosilicate chemically strengthened glass, a preparation method therefor, and application thereof.

BACKGROUND

Lithium-aluminosilicate glass can be chemically strengthened twice, where $Na^+$ is firstly used to exchange $Li^+$ on the surface of the glass, and then $K^+$ is used to exchange $Na^+$ on the surface of the glass, replacing the small ions with large ions twice to enable greater compressive stress on the surface of the glass, which can better seal the "Griffith microcracks" on the surface, and increase the strength of the glass by nearly 20 times. Therefore, this also makes lithium-aluminosilicate glass the protective glass (also known as cover glass) for the screen of touch-control smart display terminals.

Meanwhile, the lithium-aluminosilicate glass has to possess high Young's modulus and chemical corrosion resistance in order to avoid scratches and hazing during the processing before strengthening, so the existing products are mostly made with the introduction of a higher amount of oxides such as silica, alumina, zirconia, and so on to overcome this problem, however, the introduction of these oxides in an excessed amount will result in higher melting temperatures of the glass, which leads to higher requirements of the production methods and conditions of the mass production, and at the same time, this also leads to higher energy consumption.

SUMMARY

An object of embodiments of the present application is to provide a lithium-aluminosilicate glass, a lithium-aluminosilicate chemically strengthened glass, a preparation method therefor and application thereof, aiming at solving the problems of low strength, high film-peeling electrostatic voltage, and high energy consumption in the existing lithium-aluminosilicate glass.

In order to solve the above technical problems, embodiments of the present application utilize the following technical proposals:

In a first aspect, provided is a lithium-aluminosilicate glass, the lithium-aluminosilicate glass includes the following components in terms of mole percent of oxides:

$SiO_2$ 62-68 mol %;
$Al_2O_3$ 9-14 mol %;
$Na_2O$ 6-10 mol %;
$K_2O$ 0.2-0.7 mol %;
$Li_2O$ 8.0-14.0 mol %;
MgO 2.0-5.5 mol %;
where $(Li_2O+Na_2O+MgO)/Al_2O_3$ is 1.7-2.5.

Further, the lithium-aluminosilicate glass further includes the following components in terms of mole percent of oxides:

$ZrO_2$ 0.5-1.5 mol %.

Further, the lithium-aluminosilicate glass has a thickness of 0.25 mm-2.5 mm.

Further, the $Li_2O$ has a mole percent of 8.0-13.0 mol %.

Further, the $SiO_2$ has a mole percent of 63-67 mol %.

Further, the lithium-aluminosilicate glass has a compressive stress CS-30, corresponding to a depth of compressive stress layer DOL of 30 μm, of >100 MPa.

Further, a rupture height of the lithium-aluminosilicate glass when dropped with a counterweight of 180 g onto a 180-mesh silicon-carbide sandpaper at a free-fall velocity facing downward is 1.6 meters or higher.

Further, the lithium-aluminosilicate glass has a melting temperature below 1590° C.

In a second aspect, provided is a preparation method for a lithium-aluminosilicate glass, including the steps of:

- components according to the lithium-aluminosilicate glass, and
- mixing raw materials of the components in proportion, followed by melting, molding and annealing to prepare the lithium-aluminosilicate glass.

Further, a melting temperature is 1510° C.-1578° C.

In a third aspect, provided is a lithium-aluminosilicate chemically strengthened glass, the lithium-aluminosilicate chemically strengthened glass is formed by chemically strengthening the lithium-aluminosilicate glass or a lithium-aluminosilicate glass prepared by the preparation method for a lithium-aluminosilicate glass.

Further, the lithium-aluminosilicate chemically strengthened glass has a compressive stress CS-30, corresponding to a depth of compressive stress layer (DOL) of 30 μm, of >100 MPa.

Further, the lithium-aluminosilicate chemically strengthened glass has a melting temperature <1590° C. at a viscosity of $10^2$ dPa·s.

Further, when the lithium-aluminosilicate chemically strengthened glass is laminated with a module and covered with a protective film, a "film-peeling electrostatic voltage" generated at the moment of peeling off the protective film is <300 V.

In a fourth aspect, provided is a preparation method for a lithium-aluminosilicate chemically strengthened glass, including the step of: performing a strengthening treatment on the lithium-aluminosilicate glass in a molten salt of monovalent metal nitrate to obtain the lithium-aluminosilicate chemically strengthened glass.

Further, the molten salt of monovalent metal nitrate is sequentially selected from a sodium nitrate molten salt and a potassium nitrate molten salt, or the molten salt of monovalent metal nitrate is selected from a mixture of sodium nitrate molten salt and potassium nitrate molten salt;

In the strengthening treatment, a duration of the strengthening treatment is 1-3 hours, and a temperature of the strengthening treatment is 380-450° C.

Further, when the molten salt of monovalent metal nitrate is sequentially selected from the sodium nitrate molten salt and the potassium nitrate molten salt, the lithium-aluminosilicate glass is first subjected to a first strengthening treatment in a pure sodium nitrate molten salt; and then subjected to a second strengthening treatment in a pure potassium nitrate molten salt.

Further, the lithium-aluminosilicate glass having a thickness of 0.70 mm is first immersed in the pure sodium nitrate molten salt at 440° C. for 2 hours for the first chemical strengthening treatment, and is immersed in the pure potassium nitrate molten salt at 420° C. for 1.5 hours for the second chemical strengthening treatment.

In a fifth aspect, provide is an application of the lithium-aluminosilicate chemically strengthened glass or a lithium-aluminosilicate chemically strengthened glass obtained by the preparation method of a lithium-aluminosilicate chemically strengthened glass in a protective glass of a display screen.

Compared with existing technologies, the present application has the following advantageous effects:

The lithium-aluminosilicate glass of the present application controls the mole percent of $SiO_2$, $Al_2O_3$, $Na_2O$, $K_2O$ and $Li_2O$, and the range of the ratio of $(Li_2O+Na_2O+MgO)/Al_2O_3$, which ensures that the lithium-aluminosilicate glass obtained is chemically strengthened to have a high strength, while satisfying customers requirements for the "film-peeling electrostatic voltage", and also has the excellent effects of a low melting temperature and reduced energy consumption.

The preparation method of a lithium-aluminosilicate glass of the present application is simple and convenient, and the lithium-aluminosilicate glass is obtained by processes of mixing the components, melting, molding, and annealing, which is simple to operate and suitable for large-scale industrial application.

The lithium-aluminosilicate chemically strengthened glass of the present application is formed by a chemical strengthening treatment of the lithium-aluminosilicate glass, and the lithium-aluminosilicate chemically strengthened glass obtained has a compressive stress CS-30 of >100 MPa, corresponding to a depth of compressive stress layer (DOL) of 30 μm; the glass has a melting temperature <1590° C. at a viscosity of $10^2$ dPa·s; when TP is laminated with LCM and covered with a protective film, a "film-peeling electrostatic voltage" generated at the moment of peeling off the protective film is <300 V; the obtained lithium-aluminosilicate chemically strengthened glass has high strength, a low "film-peeling electrostatic voltage", and excellent properties such as a relatively low melting temperature and reduced energy consumption.

The preparation method for a lithium-aluminosilicate chemically strengthened glass of the present application involves a strengthening treatment of the lithium-aluminosilicate glass in a molten salt of monovalent metal nitrate, thus the process is simple, and conducive to a wide range of applications.

The application of lithium-aluminosilicate chemically strengthened glass in a protective glass of a display screen of the present application, due to the lithium-aluminosilicate chemically strengthened glass has a high strength, a low "film-peeling electrostatic voltage", and excellent properties such as a relatively low melting temperature and reduced energy consumption, the obtained application products also have the excellent properties of a high strength, a low "film-peeling electrostatic voltage".

BRIEF DESCRIPTION OF THE DRAWINGS

In order to more clearly illustrate the technical proposals in the embodiments of the present application, the accompanying drawings to be used in the description of the embodiments or exemplary techniques will be briefly introduced below, and it is apparent that the accompanying drawings in the following description are merely some of the embodiments of the present application, and that for those of ordinary skill in the art, other accompanying drawings can be obtained based on these drawings without making any creative effort.

DETAILED DESCRIPTION OF THE EMBODIMENTS

Figure 1:
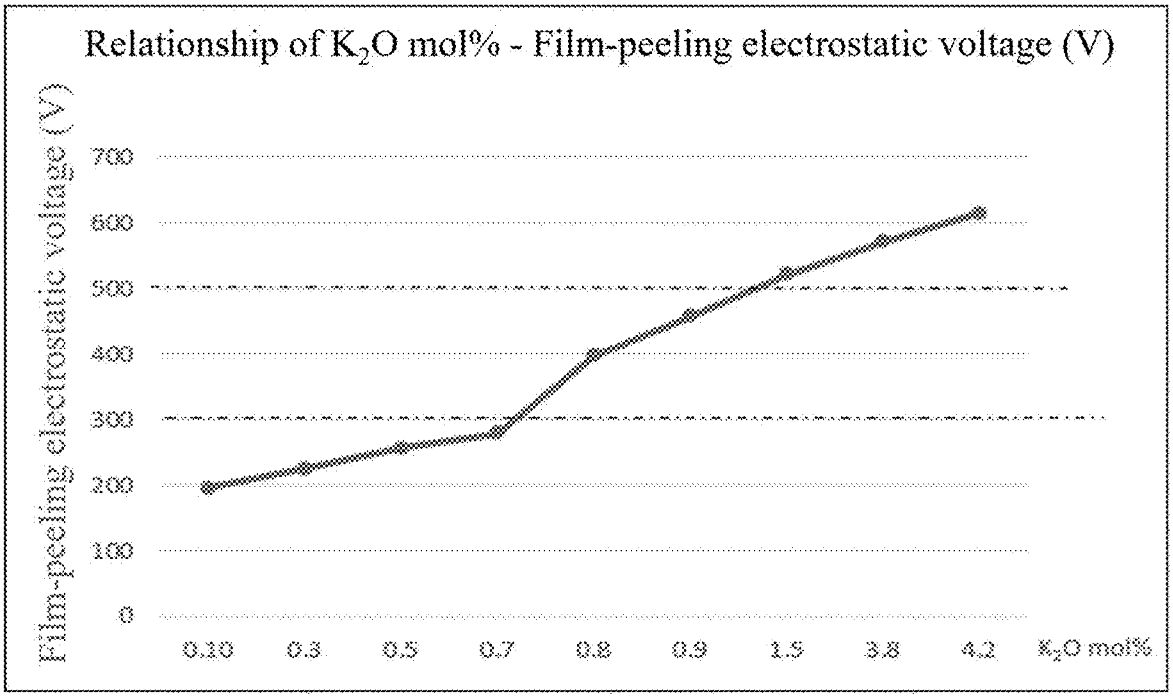
FIG. 1 is a diagram showing the relationship of the $K_2O$ content versus the film-peeling electrostatic voltage of the glass provided by an embodiment of the present application.

In order to make the technical problems be solved, the technical proposals and the advantageous effects of the present application clearer and easier to understand, the present application is described in further detail below in conjunction with the embodiments. It should be understood that the specific embodiments described herein are only for the purpose of explaining the present application and are not intended to limit the present application, and based on the embodiments in the present application, all other embodiments obtained by those of ordinary skill in the art without creative effort fall within the scope of protection of the present application.

In order to illustrate the technical proposals described in the present application, the following detailed description is provided in conjunction with accompanying drawings and specific embodiments.

A first aspect of embodiments of the present application provides a lithium-aluminosilicate glass including the following components by mole percent of oxides:

$SiO_2$ 62-68 mol %;
$Al_2O_3$ 9-14 mol %;
$Na_2O$ 6-10 mol %;
$K_2O$ 0.2-0.7 mol %;
$Li_2O$ 8.0-14.0 mol %;
MgO 2.0-5.5 mol %;
where $(Li_2O+Na_2O+MgO)/Al_2O_3$ is 1.7-2.5.

The lithium-aluminosilicate glass of the first aspect of the present application controls the mole percent of $SiO_2$, $Al_2O_3$, $Na_2O$, $K_2O$ and $Li_2O$, and the range of the ratio of $(Li_2O+Na_2O+MgO)/Al_2O_3$, which ensures that the lithium-aluminosilicate glass obtained is chemically strengthened to have a high strength, while satisfying customers' requirements for the "film-peeling electrostatic voltage", and also has the excellent effects of a low melting temperature and reduced energy consumption.

Specifically, the lithium-aluminosilicate glass, by the mole percent of oxides, includes 62-68 mol % of $SiO_2$, where $SiO_2$ is the main component of the lithium-aluminosilicate glass, and the addition of $SiO_2$ enables the glass to possess sufficient Young's modulus and chemical resistance to satisfy the requirement of users for resistance to scratches and hazing during the processing.

The mole percent of $SiO_2$ is 62-68 mol %, an addition amount of $SiO_2$ lower than 62 mol % will lead to poor chemical corrosion resistance of the lithium-aluminosilicate glass obtained, and an addition amount of $SiO_2$ higher than 68 mol % will lead to a high melting temperature of the lithium-aluminosilicate glass obtained, making the mass production difficult and increasing the energy consumption, which is unfavorable to large-scale preparation.

In some embodiments, the mole percent of $SiO_2$ in the lithium-aluminosilicate glass is 63-67 mol %. In specific embodiments, the mole percent of $SiO_2$ in the lithium-aluminosilicate glass is selected from 62 mol %, 62.5 mol %, 63 mol %, 63.5 mol %, 64 mol %, 64.5 mol %, 65 mol %, 65.5 mol %, 66 mol %, 66.5 mol %, 67 mol %, 67.5 mol % and 68 mol %.

Specifically, the lithium-aluminosilicate glass, in terms of mole percent of the oxides, includes 9-14 mol % of $Al_2O_3$, where $Al_2O_3$ can coordinate with $SiO_2$, which not only enhances the chemical resistance of the glass, but also facilitates the chemical strengthening due to the increase of the alkali-metal-ion channels during the chemical strengthening, thereby resulting in a higher compressive stress and a greater depth of compressive stress layer.

The mole percent of $Al_2O_3$ is 9-14 mol %. An addition amount of $Al_2O_3$ lower than 9 mol % will result in the obtained lithium-aluminosilicate glass having poor chemical resistance and strength, and an addition amount of $Al_2O_3$ higher than 14 mol % will result in the obtained lithium-aluminosilicate glass having a high melting temperature, which makes it difficult to realize a mass production and increases the energy consumption, and is unfavorable to large-scale preparation.

In some embodiments, the lithium-aluminosilicate glass has a mole percent of $Al_2O_3$ of 9-14 mol %. In specific embodiments, the mole percent of $Al_2O_3$ in the lithium-aluminosilicate glass is selected from 9 mol %, 9.5 mol %, 10 mol %, 10.5 mol %, 11 mol %, 11.5 mol %, 12 mol %, 12.5 mol %, 13 mol %, 13.5 mol % and 14 mol %.

Specifically, the lithium-aluminosilicate glass, in terms of mole percent of the oxides, includes 6-10 mol % of $Na_2O$, where the addition of $Na_2O$ enables a significant enhancement in the strength of the glass during chemical strengthening, and at the same time facilitates melting and reducing viscosity, i.e., lowering the melting temperature, so that the corresponding molding and annealing temperatures can be lowered to achieve the purpose of energy saving and consumption reduction; $Na_2O$ is also a necessary substance for ion exchange during the strengthening treatment, and $Na_2O$ is provided in order to ensure that the subsequent strengthening treatment is carried out smoothly.

The mole percent of $Na_2O$ is 6-10 mol %. An addition amount of $Na_2O$ lower than 6 mol % will lead to a low compressive stress achieved the ion exchange in the lithium-aluminosilicate glass obtained, and correspondingly CS-30 less than 100 MPa, thus the hindering of the "Griffith microcracks" is not ideal which results in rupture of the glass due to crack propagation. An addition amount of $Na_2O$ higher than 10 mol % will lead to a decrease of chemical stability and Young's modulus of the lithium-aluminosilicate glass, so that the glass is prone to hazing and scratches during processing by the users, which is not conducive to the use of the glass.

In some embodiments, the mole percent of $Na_2O$ in the lithium-aluminosilicate glass is 6-10 mol %. In specific embodiments, the mole percent of $Na_2O$ in the lithium-aluminosilicate glass is selected from 6 mol %, 6.5 mol %, 7 mol %, 7.5 mol %, 8 mol %, 8.5 mol %, 9 mol %, 9.5 mol % and 10 mol %.

Specifically, the lithium-aluminosilicate glass, in terms of mole percent of the oxides, includes 0.2-0.7 mol % of $K_2O$, where the addition of $K_2O$ enables a significant enhancement of the strength of the glass during chemical strengthening, and at the same time facilitates melting and reducing viscosity, i.e., lowering the melting temperature, so that the corresponding molding and annealing temperatures can be lowered to achieve the purpose of energy saving and consumption reduction; $K_2O$ is also a necessary substance for ion exchange during the strengthening treatment, and potassium ions can accelerate the movement of ions the in strengthening process and shorten the ion exchange time to improve the strengthening efficiency.

The mole percent of $K_2O$ is 0.2-0.7 mol %, as shown in FIG. 1, by controlling the mole percent of $K_2O$ to be >0.2 mol % and <0.7 mol %, the strengthening process is accelerated, the ion exchange time is reduced and the strengthening efficiency is improved, while avoiding scrap products caused by the adsorption of dust due to the "film-peeling electrostatic voltage" higher than 500 V when operating in a place with high cleanliness. If the addition amount of $K_2O$ is lower than 0.2 mol %, this will lead to longer ion exchange time during the strengthening process of the lithium-aluminosilicate glass, which results in lower strengthening efficiency; and if the addition amount of $K_2O$ is higher than 0.7 mol %, the coexistence of potassium oxide and sodium oxide has a "dual alkali effect" and increases the surface resistance of the glass, and in a situation that the glass product is chemically strengthened and coated with a AF film (anti-fingerprint film), when the glass is laminated with an LCM (LCD liquid crystal display module), the "film-peeling electrostatic voltage" generated at the moment of peeling off the outermost layer of the protective film of the products is greater than 500 V, which will adsorb a large quantity of dust particles, resulting in the scrapping of the product thus is unfavorable to the use of the product.

In some embodiments, the mole percent of $K_2O$ in the lithium-aluminosilicate glass is 0.2-0.7 mol %. In specific embodiments, the mole percent of $K_2O$ in the lithium-aluminosilicate glass is selected from 0.2 mol %, 0.25 mol %, 0.3 mol %, 0.35 mol %, 0.4 mol %, 0.45 mol %, 0.5 mol %, 0.55 mol %, 0.6 mol %, 0.65 mol % and 0.7 mol %.

Specifically, the lithium-aluminosilicate glass, by the mole percent of the oxide, includes 8.0-14.0 mol % of $Li_2O$, where the addition of $Li_2O$ enables a more significant enhancement in the strength of the glass during the chemical strengthening, and at the same time facilitates melting and reducing viscosity, i.e., lowering the melting temperature, so that the corresponding molding and annealing temperatures can be lowered to achieve the purpose of energy saving and consumption reduction; $Li_2O$ is also a necessary substance for ion exchange during the strengthening treatment, and $Li_2O$ is provided to ensure that the subsequent strengthening treatment can be carried out smoothly.

The mole percent of $Li_2O$ is 8.0-14.0 mol %. An addition amount of $Li_2O$ lower than 8.0 mol % will lead to the depth of compressive stress layer by ion exchange being too low, thus the sealing of "Griffith microcracks" is not ideal, and there will still be a high probability of glass rupture due to the propagation of cracks; an addition amount of $Li_2O$ higher than 14.0 mol % will lead to an increase in the tendency of crystal precipitation in the glass, which is prone to crystal precipitation or even loss of translucency due to defects during the production process.

In some embodiments, the mole percent of $Li_2O$ in the lithium-aluminosilicate glass is 8.0-13.0 mol %. Further, the mole percent of $Li_2O$ in the lithium-aluminosilicate glass is 8.0-12.0 mol %.

In specific embodiments, the mole percent of $Li_2O$ in the lithium-aluminosilicate glass is selected from 8 mol %, 8.5 mol %, 9 mol %, 9.5 mol %, 10 mol %, 10.5 mol %, 11 mol %, 11.5 mol % and 12 mol %.

Specifically, in the lithium-aluminosilicate glass, $(Li_2O+Na_2O+MgO)/Al_2O_3$ is 1.7-2.5; by controlling the ratio of $(Li_2O+Na_2O+MgO)/Al_2O_3$, the compressive stress CS-30 of the lithium-aluminosilicate glass obtained after the strengthening treatment corresponding to a depth of compressive stress layer DOL of 30 μm is >100 MPa, and such a strength can effectively hinder the "Griffith microcracks". A rupture height of the lithium-aluminosilicate glass, when dropped with a simulation cell phone loaded with 180 g counterweight onto a 180-mesh silicon-carbide sandpaper at a free-fall velocity facing the ground, is 1.6 meters or higher; and the melting temperature of the glass is lower than 1590° C., correspondingly the molding and annealing temperature is also relatively low, which facilitates the mass production and energy saving; it can be ensured that the obtained lithium-aluminosilicate glass is scratch-resistant before chemical strengthening and is chemical resistant after the chemical strengthening, with the characteristics of low melting temperature, high ion exchange rate and high strength.

In some embodiments, an alkaline earth metal oxide is added into some lithium-aluminosilicate glass, which aids in lowering the melting temperature, regulating properties of the glass forming materials, and the addition is conducive to the management and control of the forming temperature and has the effect of inhibiting crystal precipitation. However, because the radii of the $Ca^+$, $Sr^+$ and $Ba^+$ ions are relatively large, which are 1.00 Å, 1.18 Å and 1.35 Å, respectively, this causes "congestion" of the glass structure grid and hinders the transportation in the ion exchange channel, which results in low ion exchange efficiency, the lithium-aluminosilicate glass provided by the present application does not use raw materials introducing $Ca^+$, $Sr^+$ and $Ba^+$ ions, instead, uses a raw material of magnesium oxide which has a small ionic radius.

Further, the lithium-aluminosilicate glass, by the mole percent of the oxide, includes 2.0-5.5 mol % of MgO. The introduction of MgO aids in lowering the melting temperature and adjusting the properties of the glass forming materials, and the addition is conducive to the control of the molding temperature and has the effect of inhibiting the crystal precipitation. Moreover, the magnesium ion in the magnesium oxide has a small radius of only 0.72 Å, which can lower the melting temperature, inhibit the crystal precipitation and adjust the properties of the forming materials, while providing a smooth ion exchange channel.

In some embodiments, the mole percent of MgO in the lithium-aluminosilicate glass is 2.0-5.5 mol %. In specific embodiments, in the lithium-aluminosilicate glass, the mole percent of MgO is selected from 2 mol %, 2.5 mol %, 3 mol %, 3.5 mol %, 4 mol %, 4.5 mol % and 5 mol %.

Further, the lithium-aluminosilicate glass, by the mole percent of the oxide, includes 0.5-1.5 mol % of $ZrO_2$, and the introduction of $ZrO_2$ aids in increasing the intrinsic strength of the glass, i.e., to increasing the elastic modulus, and also in increasing the scratch resistance and the chemical resistance during processing prior to the chemical strengthening. An addition amount of $ZrO_2$ being too high will increase the viscosity of the glass and increase the difficulties in melting as well as the energy consumption.

In some embodiments, the mole percent of $ZrO_2$ in the lithium-aluminosilicate glass is 0.5-1.5 mol %. In specific embodiments, the mole percent of $ZrO_2$ in the lithium-aluminosilicate glass is selected from 0.5 mol %, 1 mol % and 1.5 mol %.

Further, the lithium-aluminosilicate glass has a thickness of 0.25 mm-2.5 mm.

A second aspect of embodiments of the present application provides a preparation method for a lithium-aluminosilicate glass, including the steps of:

S01. components according to the lithium-aluminosilicate glass; and

S02. mixing raw materials of the components in proportion, followed by melting, molding, and annealing to obtain the lithium-aluminosilicate glass.

In the preparation method for a lithium-aluminosilicate glass provided in the second aspect of the embodiments of the present application, the raw materials of each component of the lithium-aluminosilicate glass are subjected to mixing, melting, molding, and annealing, sequentially, the lithium-aluminosilicate glass obtained has a high strength after strengthening, satisfies the customer's requirement for the "film-peeling electrostatic voltage", and shows excellent effects of low melting temperature and low energy consumption. In addition, the preparation method is simple and convenient, easy to operate, and suitable for large-scale industrial applications.

In step S01, the content of each component is provided according to the lithium-aluminosilicate glass provided above and ratios of the raw materials are determined, which will not be repeated herein for brevity.

In step S02, the raw materials of the components are mixed in proportion, melted, molded, and annealed to prepare to obtain a lithium-aluminosilicate glass. The melting temperature 1510° C. to 1578° C. The melting is carried out at this temperature. Further, the method further includes quality inspection, cutting and slicing, sorting, stacking, sampling, and warehousing.

The third aspect of the embodiments of the present application provides a lithium-aluminosilicate chemically strengthened glass. The lithium-aluminosilicate chemically strengthened glass is formed by chemically strengthening the lithium-aluminosilicate glass or a lithium-aluminosilicate glass obtained by the preparation method for a lithium-aluminosilicate glass.

The lithium-aluminosilicate chemically strengthened glass of the third aspect of the present application, which is obtained by chemically strengthening the lithium-aluminosilicate glass, has a compressive stress CS-30, corresponding to a depth of compressive stress layer (DOL) of 30 μm, of >100 MPa; the melting point of the chemically strengthened glass at a viscosity of $10^2$ dPa·s is <1590° C.; after the glass is laminated with a module and covered with a protective film, the "film-peeling electrostatic voltage" generated at the moment of peeling off the protective film is <300 V; the lithium-aluminosilicate chemically strengthened glass obtained has high strength, with low "film-peeling electrostatic voltage" and low melting temperature, as well as the excellent properties of low energy consumption.

A fourth aspect of embodiments of the present application provides a preparation method for a lithium-aluminosilicate chemically strengthened glass, including the steps of:

G01. performing a strengthening treatment on a lithium-aluminosilicate glass in a molten salt of monovalent metal nitrate to obtain a lithium-aluminosilicate chemically strengthened glass.

The preparation method for a lithium-aluminosilicate chemically strengthened glass provided by the fourth aspect of embodiments of the present application involves performing a strengthening treatment on a lithium-aluminosilicate glass in a molten salt of monovalent metal nitrate, and the obtained lithium-aluminosilicate chemically strengthened glass has a compressive stress CS-30, corresponding to a depth of compressive stress layer (DOL) of 30 μm, of >100 MPa; the melting point of the chemically strengthened glass at a viscosity of $10^2$ dPa·s is <1590° C.; after the TP is attached with an LCM and covered with a protective film, the "film-peeling electrostatic voltage" generated at the moment of peeling off the protective film is <300 V; thus, the lithium-aluminosilicate chemically strengthened glass obtained has high strength, with low "film-peeling electrostatic voltage" and low melting temperature, as well as the excellent properties of low energy consumption. In addition, the preparation method is simple and convenient, easy to operate, and suitable for large-scale industrial applications.

In step G01, the molten salt of monovalent metal nitrate is selected from sodium nitrate molten salt and potassium nitrate molten salt, or the molten salt of monovalent metal nitrate is selected from a mixture of sodium nitrate molten salt and potassium nitrate molten salt.

In some embodiments, when the molten salt of monovalent metal nitrate is selected from sodium nitrate molten salt and potassium nitrate molten salt, the lithium-aluminosilicate glass is subjected to a first strengthening treatment in pure sodium nitrate molten salt, and then subjected to a second strengthening treatment in pure potassium nitrate molten salt.

In other embodiments, the lithium-aluminosilicate glass is subjected to two strengthening treatments in a mixture of sodium nitrate molten salt and potassium nitrate molten salt.

In the step of strengthening treatment, the duration of the strengthening treatment is 1-3 hours, and the temperature of the strengthening treatment is 380-450° C.

In a specific embodiment, taking a 0.70 mm glass plate for an example, the glass plate is subjected to a first chemical strengthening by immersing in pure sodium nitrate molten salt at 440° C. for 2 hours, followed by a second chemical strengthening by immersing in pure potassium nitrate molten salt at 420° C. for 1.5 hours.

A fifth aspect of the embodiments of the present application provides an application of the lithium-aluminosilicate chemically strengthened glass or a lithium-aluminosilicate chemically strengthened glass obtained by the preparation method for a lithium-aluminosilicate chemically strengthened glass in a protective glass of a display screen.

Further, the lithium-aluminosilicate chemically strengthened glass is utilized in applications including, but not limited to, protection of display screens for electronic devices, automotive windows, and automotive protective glass.

In the fifth aspect of the embodiments of the present application, the application of the lithium-aluminosilicate chemically strengthened glass in a protective glass of a display screen is provided, and because the lithium-aluminosilicate chemically strengthened glass has high strength, with low "film-peeling electrostatic voltage" and low melting temperature, as well as the excellent properties of low energy consumption, the obtained application products also have the excellent characteristics of high strength and low "film-peeling electrostatic voltage".

A description will be given below in conjunction with specific examples.

EXAMPLES AND COMPARATIVE EXAMPLES

For brevity, the components of the lithium-aluminosilicate glasses of Examples 1 to 5 and Comparative Examples 1 to 3 are listed in Table 1. According to the glass components provided in Table 1, the glass was prepared as follows:

According to the components of the lithium-aluminosilicate glass, the raw materials required were calculated, and the raw materials were mixed well and prepared into a 0.70 mm glass plate by float, overflow or crucible kiln melting process. Subsequently, the glass plate was cut and quality checked to obtain a lithium-aluminosilicate glass.

The lithium-aluminosilicate glasses obtained in Examples 1 to 5 and the Comparative Examples 1 to 3 were subjected to a first chemical strengthening by immersing in a pure sodium nitrate molten salt at 440° C. for 2 hours, followed by a second chemical strengthening of immersing in a pure potassium nitrate molten salt at 420° C. for 1.5 hours, to obtain lithium-aluminosilicate chemically strengthened glasses of Examples 1 to 5 and the Comparative Examples 1 to 3, respectively.

TABLE 1

| Chemical composition | Example 1 mol % | Example 2 mol % | Example 3 mol % | Example 4 mol % | Example 5 mol % | Comparative Example 1 mol % | Comparative Example 2 mol % | Comparative Example 3 mol % |
|---|---|---|---|---|---|---|---|---|
| $SiO_2$ | 62.0 | 68.0 | 65.0 | 67.0 | 63.0 | 61.0 | 69.0 | 60.0 |
| $Al_2O_3$ | 14.0 | 9.0 | 11.0 | 9.1 | 13.2 | 15.0 | 8.0 | 14.0 |
| $Na_2O$ | 6.0 | 9.0 | 7.0 | 6.0 | 8.5 | 11.0 | 5.0 | 12.0 |
| $K_2O$ | 0.5 | 0.7 | 0.2 | 0.3 | 0.6 | 0.10 | 0.8 | 1.0 |
| $Li_2O$ | 14.0 | 8.0 | 12.0 | 11.5 | 11.0 | 7.0 | 14.9 | 7.0 |
| MgO | 2.0 | 4.8 | 3.8 | 5.5 | 3.0 | 4.3 | 1.9 | 6.0 |
| $ZrO_2$ | 1.5 | 0.5 | 1.0 | 0.6 | 0.7 | 1.6 | 0.4 | 0.0 |
| $(Li_2O + Na_2O + MgO)/Al_2O_3$ | 2.4 | 2.4 | 2.1 | 2.5 | 1.7 | 1.5 | 2.7 | 1.8 |

Performance Tests

The following performance tests were performed on the lithium-aluminosilicate glasses of Examples 1 to 5 and Comparative Examples 1 to 3 above and the lithium-aluminosilicate chemically strengthened glasses of Examples 1 to 5 and Comparative Examples 1 to 3:

(1) the lithium-aluminosilicate glasses of Examples 1 to 5 and Comparative Examples 1 to 3 were provided and tested for the melting temperature, namely the temperature corresponding to a viscosity of $10^2$ dPa·s, in accordance with the ASTM C965 method for determining glass viscosity.

(2) The lithium-aluminosilicate chemically strengthened glasses of Examples 1 to 5 and Comparative Examples 1 to 3 were provided and the CS-30 was tested using the SLP-200 scattered light photoelastic stress meter from Origami Co., Ltd., Japan.

(3) The lithium-aluminosilicate chemically strengthened glasses of Examples 1 to 5 and Comparative Examples 1 to 3 were provided, and a drop test was performed to test a drop height of an integrated device, the test was performed as follows: a drop testing machine, model HE-DL-315D, from Dongguan Haoen Automation Equipment Co., Ltd. was used, a cell phone prototype of a weight of 180 g was used, the ground was covered with a 180-mesh silicon-carbide sandpaper, the prototype was dropped in free fall facing downward, the starting point was 90 cm, with an increment of 5 cm each time, until the glass was broken (namely the appearance of cracks).

(4) The lithium-aluminosilicate chemically strengthened glasses of Examples 1 to 5 and Comparative Examples 1 to 3 were provided, after the evaporation of an AF film on one side, the uncoated surface was attached with an LCM using OCA adhesive, at this point the glass plate was referred to a module covered with a cover glass, and a protective film was attached to the surface of the module to test the "film-peeling electrostatic voltage", the test method was as follows: an electrostatic voltmeter, model TREK-520 (USA), was used, the measurement range was 0 to ±1999 V, the humidity required for the test environment was 40%-60%, the temperature was 18-28° C.; the probe of the electrostatic voltmeter was kept perpendicular to the surface of the measured sample, with an tester wearing anti-static gloves and anti-static wristbands, the distance between the testing probe and the surface of the glass was 5-15 mm, the speed of peeling the film was 0.5 s, with the sample being suspended over the table, the electrostatic voltage at the moment of peeling the film was tested.

TABLE 2

| Result of performance tests | Example 1 | Example 2 | Example 3 | Example 4 | Example 5 | Comparative Example 1 | Comparative Example 2 | Comparative Example 3 |
|---|---|---|---|---|---|---|---|---|
| T2($10^2$ dPa · s) | 1510° C. | 1582° C. | 1560° C. | 1576° C. | 1578° C. | 1620 | 1612 | 1654 |
| CS-30 | 125 | 109 | 138 | 135 | 126 | 83 | 91 | 85 |
| Film-peeling electrostatic voltage (V) | 226 | 272 | 185 | 196 | 269 | 215 | 368 | 523 |
| Drop height (180 g load, 180-mesh silicon-carbide sandpaper) | 165 | 170 | 190 | 180 | 185 | 80 | 85 | 90 |

Results and Analysis

The results of the performance tests on the lithium-aluminosilicate glass of Examples 1 to 5 and Comparative Examples 1 to 3 and the lithium-aluminosilicate chemically strengthened glass of Examples 1 to 5 and Comparative Examples 1 to 3 are shown in Table 2. The lithium-aluminosilicate glasses obtained in Examples 1 to 5 have a melting temperature of <1590° C., and the lithium-aluminosilicate chemically strengthened glasses obtained in Examples 1 to 5 have a CS-30>100 MPa; the film-peeling electrostatic voltage (V) is <300 V, and the drop height (with 180 g load, 180-mesh silicon-carbide sandpaper) is >160 cm. It can be found that the lithium-aluminosilicate glasses provided in Examples 1 to 5 have high strength after chemical strengthening, satisfy the customer's requirement for the "film-peeling electrostatic voltage", and show excellent effects of low melting temperature and low energy consumption.

Whereas in the lithium-aluminosilicate glass in Comparative Examples 1 to 3, although the "film-peeling electrostatic voltage" of Comparative Example 1 is less than 300 V, all other properties fail to reach the expected effect of the present application. For the properties in the Comparative Examples 2 to 3, the melting temperature is >1610° C., CS-30 is less than 95 MPa, the film-peeling electrostatic voltage (V) is >300 V, and the drop height (with 180 g load, 180-mesh silicon-carbide sandpaper) is <90 cm, all of these properties fail to achieve the expected effects of the present application, namely, a melting temperature <1590° C., a CS-30>100 MPa, a film-peeling electrostatic voltage (V)<300 V, and a drop height (with 180 g load, 180-mesh silicon-carbide sandpaper)>160 cm.

Figure 2:
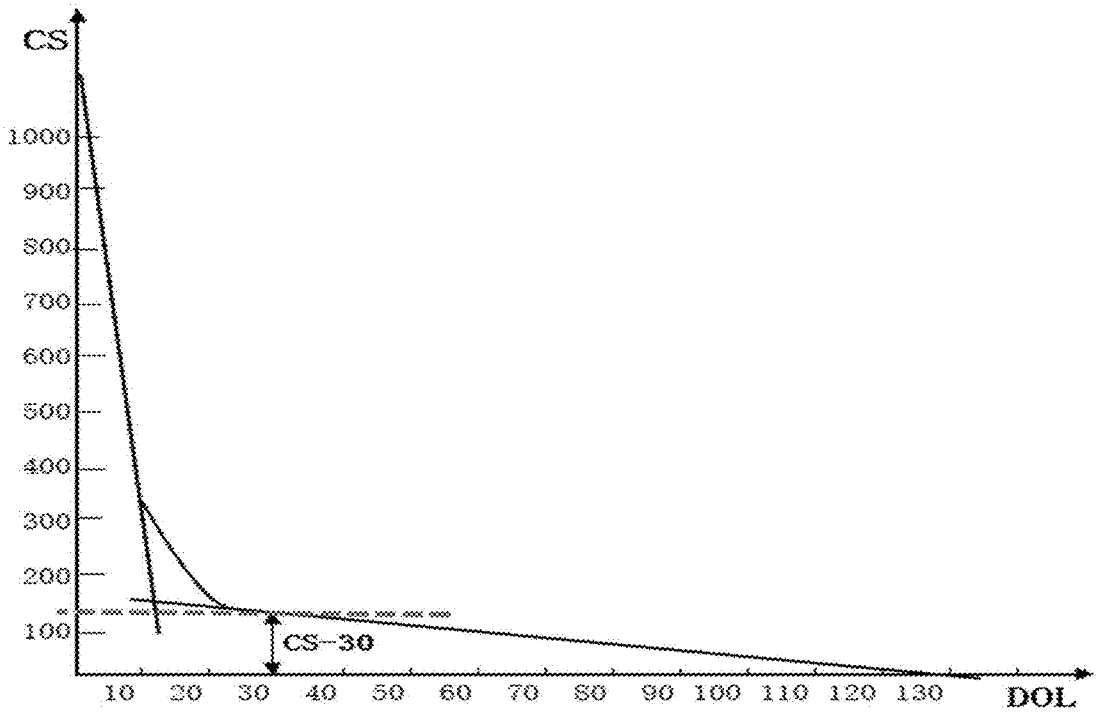
FIG. 2 is a diagram showing the relationship of the depth of compressive stress layer DOL and CS of the glass provided by an embodiment of the present application.

As shown in FIG. 2, in the lithium-aluminosilicate glasses after the strengthening treatment obtained in Examples 1 to 5, the compressive stress CS-30 when the depth of compressive stress layer DOL is 30 μm is >100 MPa, such strength can effectively hinder the "Griffith microcracks", and the rupture height using the cell phone prototype loaded with a counterweight of 180 g falling onto the 180-mesh silicon-carbide sandpaper at free-fall speed and facing downward is 1.6 meters or higher.

In summary, the lithium-aluminosilicate glass provided in the present application, by controlling the mole percent of $SiO_2$, $Al_2O_3$, $Na_2O$, $K_2O$ and $Li_2O$, as well as the range of the ratio of $(Li_2O+Na_2O+MgO)/Al_2O_3$, ensures that the obtained lithium-aluminosilicate glass has a high strength after the chemical treatment, satisfies the customer's requirement for the "film-peeling electrostatic voltage", and shows excellent effects of low melting temperature and low energy consumption.

The above are only optional embodiments of the present application and are not intended to limit the application. For those skilled in the art, the present application may be subjected to various changes and modifications. Any modifications, equivalent substitutions, improvements, etc. made within the spirit and principles of the present application fall within the scope of the claims of the present application.

What is claimed is:

1. A lithium-aluminosilicate glass, consisting of the following components by mole percent of oxides:

$SiO_2$ 62-68 mol %;

$Al_2O_3$ 9-14 mol %;

$Na_2O$ 6-10 mol %;

$K_2O$ 0.2-0.7 mol %;

$Li_2O$ 8.0-14.0 mol %;

MgO 2.0-5.5 mol %; and $ZrO_2$ 0.5-1.5 mol %;

wherein, $(Li_2O+Na_2O+MgO)/Al_2O_3$ is 1.7 to 2.5.

2. The lithium-aluminosilicate glass according to claim 1, wherein, the $Li_2O$ has a mole percent of 8.0-13.0 mol %; and/or the $SiO_2$ has a mole percent of 63-67 mol %.

3. The lithium-aluminosilicate glass according to claim 1, wherein, the lithium-aluminosilicate glass has a compressive stress CS-30, corresponding to a depth of compressive stress layer DOL of 30 μm, of >100 MPa; and/or a rupture height of the lithium-aluminosilicate glass, when dropped with a counterweight of 180 g onto a 180-mesh silicon-carbide sandpaper at a free-fall velocity facing downward, is 1.6 meters or higher.

4. The lithium-aluminosilicate glass according to claim 1, wherein, the $Li_2O$ has a mole percent of 8.0-13.0 mol %; and/or the $SiO_2$ has a mole percent of 63-67 mol %.

5. The lithium-aluminosilicate glass according to claim 1, wherein, the lithium-aluminosilicate glass has a compressive stress CS-30, corresponding to a depth of compressive stress layer DOL of 30 μm, of >100 MPa; and/or a rupture height of the lithium-aluminosilicate glass, when dropped with a counterweight of 180 g onto a 180-mesh silicon-carbide sandpaper at a free-fall velocity facing downward, is 1.6 meters or higher.

6. A preparation method for a lithium-aluminosilicate glass, comprising the steps of:

obtaining components of the lithium-aluminosilicate glass according to claim 1; and mixing raw materials of the components in proportion, followed by melting, molding and annealing to obtain the lithium-aluminosilicate glass.

7. A lithium-aluminosilicate chemically strengthened glass, wherein the lithium-aluminosilicate chemically strengthened glass is formed by chemically strengthening the lithium-aluminosilicate glass according to claim 1.

8. The lithium-aluminosilicate chemically strengthened glass according to claim 7, wherein the lithium-aluminosilicate chemically strengthened glass has a compressive stress CS-30, corresponding to a depth of compressive stress layer (DOL) of 30 μm, of >100 MPa;

the lithium-aluminosilicate chemically strengthened glass has a melting temperature <1590° C. at a viscosity of $10^2$ dPa·s; and when the lithium-aluminosilicate chemically strengthened glass is laminated with a module and covered with a protective film, a film-peeling electrostatic voltage generated at the moment of peeling off the protective film is <300 V.

9. A preparation method for a lithium-aluminosilicate chemically strengthened glass, comprising the step of:

performing a strengthening treatment on the lithium-aluminosilicate glass according to claim 1 in a molten salt of monovalent metal nitrate to obtain the lithium-aluminosilicate chemically strengthened glass;

wherein the molten salt of monovalent metal nitrate is sequentially selected from a sodium nitrate molten salt and a potassium nitrate molten salt, or the molten salt of monovalent metal nitrate is selected from a mixture of sodium nitrate molten salt and potassium nitrate molten salt; and/or in the strengthening treatment, a duration of the strengthening treatment is 1-3 hours, and a temperature of the strengthening treatment is 380° C.-450° C.

10. The preparation method for a lithium-aluminosilicate chemically strengthened glass according to claim 9, wherein when the molten salt of monovalent metal nitrate is sequentially selected from the sodium nitrate molten salt and the potassium nitrate molten salt, the lithium-aluminosilicate glass is first subjected to a first strengthening treatment in a pure sodium nitrate molten salt; and then subjected to a second strengthening treatment in a pure potassium nitrate molten salt.

11. The preparation method for a lithium-aluminosilicate chemically strengthened glass according to claim 10, wherein the lithium-aluminosilicate glass having a thickness of 0.70 mm is first immersed in the pure sodium nitrate molten salt at 440° C. for 2 hours for the first chemical strengthening treatment, and is immersed in the pure potassium nitrate molten salt at 420° C. for 1.5 hours for the second chemical strengthening treatment.

12. An application of the lithium-aluminosilicate chemically strengthened glass according to claim 8 in a protective glass of a display screen.

13. A preparation method for a lithium-aluminosilicate glass, comprising the steps of:

obtaining components of the lithium-aluminosilicate glass according to claim 1; and mixing raw materials of the components in proportion, followed by melting, molding and annealing to obtain the lithium-aluminosilicate glass.

14. A lithium-aluminosilicate chemically strengthened glass, wherein the lithium-aluminosilicate chemically strengthened glass is formed by chemically strengthening the lithium-aluminosilicate glass according to claim 1.

15. The lithium-aluminosilicate chemically strengthened glass according to claim 14, wherein the lithium-aluminosilicate chemically strengthened glass has a compressive stress CS-30, corresponding to a depth of compressive stress layer (DOL) of 30 μm, of >100 MPa;

the lithium-aluminosilicate chemically strengthened glass has a melting temperature <1590° C. at a viscosity of $10^2$ dPa·s; and when the lithium-aluminosilicate chemically strengthened glass is laminated with a module and covered with a protective film, a film-peeling electrostatic voltage generated at the moment of peeling off the protective film is <300 V.

16. A preparation method for a lithium-aluminosilicate chemically strengthened glass, comprising the step of:

performing a strengthening treatment on the lithium-aluminosilicate glass according to claim 1 in a molten salt of monovalent metal nitrate to obtain the lithium-aluminosilicate chemically strengthened glass;

wherein the molten salt of monovalent metal nitrate is sequentially selected from a sodium nitrate molten salt and a potassium nitrate molten salt, or the molten salt of monovalent metal nitrate is selected from a mixture of sodium nitrate molten salt and potassium nitrate molten salt; and/or in the strengthening treatment, a duration of the strengthening treatment is 1-3 hours, and a temperature of the strengthening treatment is 380° C.-450° C.

17. The preparation method for a lithium-aluminosilicate chemically strengthened glass according to claim 16, wherein when the molten salt of monovalent metal nitrate is sequentially selected from the sodium nitrate molten salt and the potassium nitrate molten salt, the lithium-aluminosilicate glass is first subjected to a first strengthening treatment in a pure sodium nitrate molten salt; and then subjected to a second strengthening treatment in a pure potassium nitrate molten salt.

18. The preparation method for a lithium-aluminosilicate chemically strengthened glass according to claim 17, wherein the lithium-aluminosilicate glass having a thickness of 0.70 mm is first immersed in the pure sodium nitrate molten salt at 440° C. for 2 hours for the first chemical strengthening treatment, and is immersed in the pure potassium nitrate molten salt at 420° C. for 1.5 hours for the second chemical strengthening treatment.

19. An application of the lithium-aluminosilicate chemically strengthened glass according to claim 15 in a protective glass of a display screen.

* * * * *